(12) United States Patent
Matthews

(10) Patent No.: US 7,928,862 B1
(45) Date of Patent: Apr. 19, 2011

(54) DISPLAY OF HOVER AND TOUCHDOWN SYMBOLOGY ON HEAD-UP DISPLAY

(75) Inventor: Ronald B. Matthews, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1481 days.

(21) Appl. No.: 11/343,138

(22) Filed: Jan. 30, 2006

(51) Int. Cl.
| | |
|---|---|
| *G08B 21/00* | (2006.01) |
| *G01C 21/00* | (2006.01) |
| *G01C 17/00* | (2006.01) |
| *G01C 19/00* | (2006.01) |
| *G02B 27/14* | (2006.01) |
| *G09G 5/00* | (2006.01) |

(52) U.S. Cl. .................. 340/946; 244/17.11; 73/178 H; 359/630; 345/7; 345/8; 340/980

(58) Field of Classification Search .................. 340/946, 340/980; 701/16; 244/17.11; 73/178 H; 359/630; 345/7–8

See application file for complete search history.

(56) References Cited

U.S. PATENT DOCUMENTS

| | | | | |
|---|---|---|---|---|
| 4,736,331 A * | 4/1988 | Lappos et al. | .................. | 701/14 |
| 4,829,441 A * | 5/1989 | Mandle et al. | .................. | 702/96 |
| 4,936,142 A * | 6/1990 | Davidson | ........................ | 73/179 |
| 6,985,091 B2 * | 1/2006 | Price | ............................. | 340/975 |
| 2005/0237226 A1 * | 10/2005 | Judge et al. | .................. | 340/946 |

* cited by examiner

*Primary Examiner* — Lin Ye
*Assistant Examiner* — Chia-Wei A Chen
(74) *Attorney, Agent, or Firm* — Matthew J. Evans; Daniel M. Harbieri

(57) ABSTRACT

A head-up display (HUD) is disclosed. The HUD is on board a rotary wing aircraft. The HUD comprises a projector. The HUD also comprises a combiner. The combiner enables viewing of the world outside of the combiner and allows viewing of information provided from the projector. Further, the HUD comprises a computer coupled to the projector in providing hover and touchdown symbols conformally mapped onto the combiner. A conformal mapping of hover and touchdown symbols is also provided on the combiner.

19 Claims, 5 Drawing Sheets

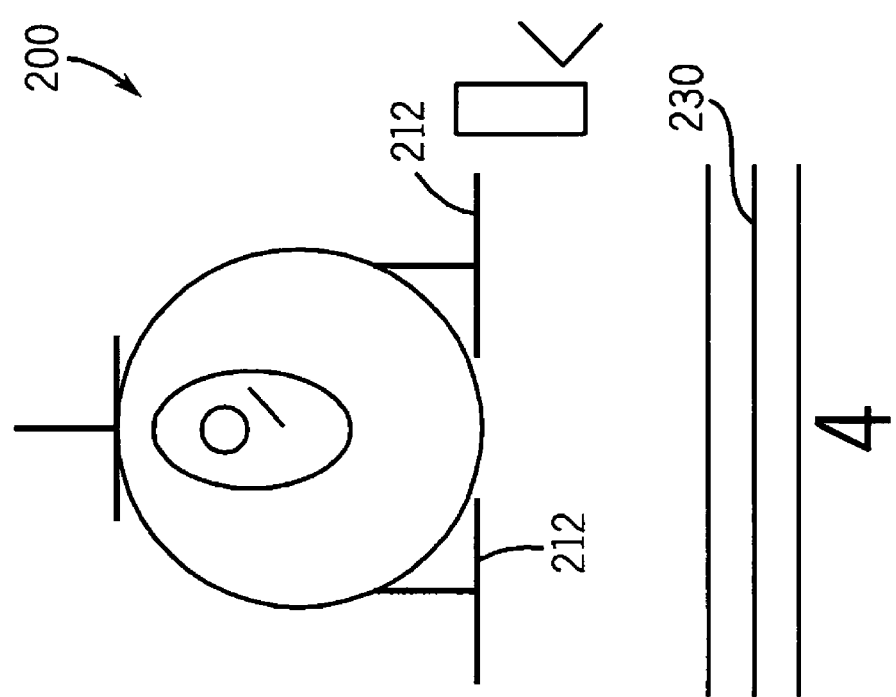

DISPLAY OF HOVER AND TOUCHDOWN SYMBOLOGY ON HEAD-UP DISPLAY

BACKGROUND

Head-up displays (HUD) and head-up guidance systems (HGS) have been used effectively for aircraft pilots and in other vehicles as an aid to provide information to the pilot or vehicle controller while not requiring the pilot to take his eyes off the outside environment. Further, head-up displays have been used to augment and enhance the outside environment by placing conformal information on the head-up display.

Head-up displays have been widely used in aircraft landing systems, flight guidance systems, and the like. However, standard usage and displays associated with these displays are not always applicable to all operating modes of all different types of aircraft. In particular, for a rotary wing aircraft transitioning from forward to flight to near hover conditions, it is very likely that that flight path vector traditionally displayed will depart from the field of view of the HUD. Accordingly, there is a need for information having to do with hover and touchdown operating modes such as that which would be used during takeoff and landing, to be provided on the HUD. Further, for an aircraft with the capability for coupled hover, there is a need for a HUD displaying the non-conformal flight path vector and vertical velocity to satisfy the hover capture criteria. Yet further there is a need to provide this information in a single head up display such that the pilot is not required to look at a different displays for the information.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a head-up display (HUD). The HUD is on board a rotary wing aircraft. The HUD comprises a projector. The HUD also comprises a combiner. The combiner enables viewing of the world outside of the combiner and allows viewing of information provided from the projector. Further, the HUD comprises a computer coupled to the projector in providing hover and touchdown symbols conformally mapped onto the combiner. A conformal mapping of hover and touchdown symbols is also provided on the combiner.

What is also provided is method of providing hover and touchdown symbols on a rotary wing aircraft combiner for a head-up display (HUD). The method includes determining current three dimensional velocity information for the aircraft, determining whether the current three dimensional velocity information satisfies one or more hover capture criteria, generating a composite hover symbology display based on whether the current attitude information satisfies the one or more hover capture criteria, and conformally mapping the composite hover symbology display onto a combiner of the HUD.

Further, what is provide is a system for projecting hover and touchdown symbols on a combiner of a head-up display (HUD). The system includes a projection means and a combiner means. The combiner means enables viewing of the world outside of the combiner means and allows viewing of information provided from the projection means. The system further includes a computing means coupled to the projection means and providing hover and touchdown symbols representative of velocity information for a rotary wing aircraft conformally mapped onto the combiner means.

Alternative examples of other exemplary embodiments are also provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 4 is another embodiment of the system of FIG. 2, according to an exemplary embodiment.

DETAILED DESCRIPTION OF PREFERRED AND EXEMPLARY EMBODIMENTS

Figure 1A:
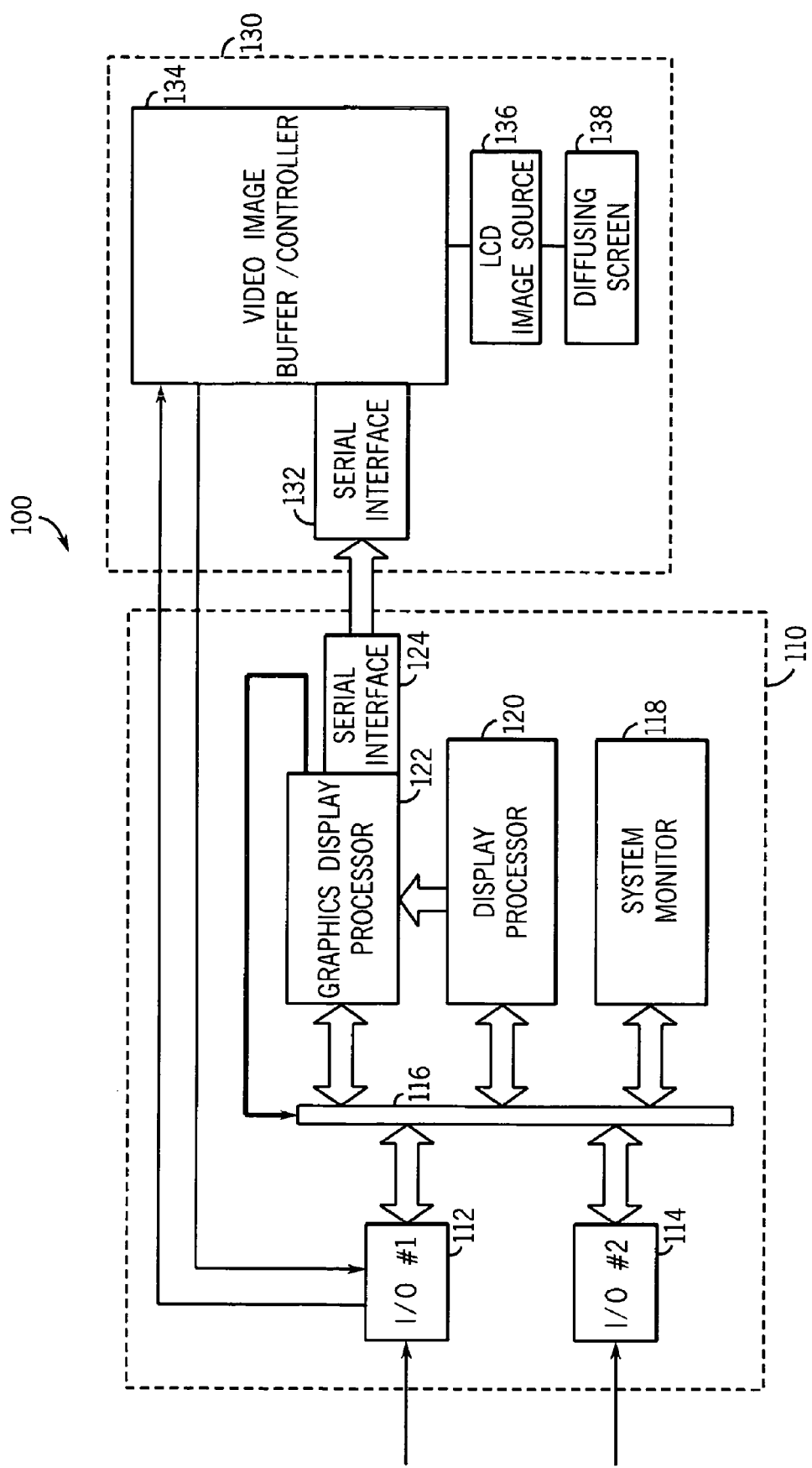
FIG. 1A is a block diagram is illustrated depicting a LCD based head-up display (HUD) system 100, according to an exemplary embodiment.

Before describing in detail the particular improved system and method, it should be observed that the invention includes, but is not limited to, a novel structural combination of conventional data/signal processing components and communications circuits, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In an exemplary embodiment, a computer system is used which has at least one processing unit that executes sequences of instructions contained in a memory. More specifically, execution of the sequences of instructions causes the processing unit to perform steps, which are described below. The instructions may be loaded into a random access memory (RAM) for execution by the processing unit from a read-only memory (ROM), a mass storage device, or some other persistent storage. In other embodiments, hardwired circuitry may be used in place of, or in combination with, software instructions to implement the exemplary embodiments. Thus, the embodiments described herein are not limited to any specific combination of hardware circuitry and software, nor to any particular source for the instructions executed by the computer system.

Referring to FIG. 1A, a block diagram is illustrated depicting a LCD based head-up display (HUD) system 100, according to an exemplary embodiment. HUD system 100 includes a HUD computer 110 and an overhead projection unit 130.

HUD computer 110 is a computer system including a first input and output port 112, a second input and output port 114, a data bus 116, a system monitor 118, a display processor 120, and a graphics display processor 122. The graphics display processor further includes a serial interface 124.

HUD computer 110 includes first input and output port 112 and second input and output port 114 to create dual input/output (I/O) channels to eliminate undetected sensor based errors, as will be further discussed below with reference to FIG. 4. First input and output port 112 and second input and output port 114 are each coupled to a unique avionic data bus carrying sensor data (e.g. aircraft three dimensional velocity data) for the aircraft. These aircraft buses are implemented using the ARINC 429 data bus protocol. Both first input and output port 112 and second input and output port 114 are coupled to both external ARINC data buses (not shown) and internal data bus 116.

Internal data bus 116 is configured to implement a first method for transferring data within HUD computer 110. Data bus 116 may be any type of data bus implementing any of a variety of data bus protocols. According to an exemplary embodiment, data bus 116 is a Peripheral Component Interconnect (PCI) bus.

System monitor 118 is a processor configured to receive sensor feedback values from sensors within the HGS system 100 and compare the received sensor feedback values with expected value or received redundant sensor values. According to an exemplary embodiment, system monitor 118 is a 200 MHz PowerPC processor manufactured by Motorola of Schaumburg, Ill. Whenever system monitor 118 detects a sensor comparison failure, a warning message is conveyed to be displayed on display processor 120 for response. System monitor 118 is coupled to data bus 116.

Display processor 120 is a processor configured to validate and compare input sensor data, determine the symbology set displayed to the pilot based on the phase of flight (take off, cruise, approach, landings), compute the position of all symbology, compute any guidance algorithms controlling the position of the guidance cue, and generate and format a display list for graphics display processor 122. Display processor 120 is the main controller for HUD system 100 and is configured to manage the flow of data through the data path. Display processor 120 is coupled to data bus 116 and graphic display processor 122.

Graphics display processor 122 is a processor configured to receive graphics instructions from display processor 120 and convert the data into graphical data for transmission through serial interface 124 to overhead projection unit 130. According to an exemplary embodiment, graphics display processor 122 is a graphics engine operating on a processor to turn graphics instruction into a pixel representation of an image. Graphics display processor 122 is coupled to data bus 116 and display processor 120. Graphics display processor 122 further includes serial interface 124 through which data is transmitted to overhead projection unit 130.

Although HUD computer 110 is shown in FIG. 1 with a specific configuration of components and couplings, it is understood that HUD computer 110 may include more, fewer, or different components in a variety of arrangements that are configured to perform the functions described herein. For example, according to an alternative embodiment, HUD computer 110 may further include a low voltage power supply that is configured to provide power to the components of HUD computer 110. Further, the components may be independent components configured to interact to perform the functions described herein as well as additional functions. Yet further, function described as being performed by separate components may be performed by a single component.

Overhead projection unit 130 includes a serial interface 132, a video image buffer/controller 134, a LCD image source 136, and a diffusing screen 138. Overhead projection unit 130 is generally configured to receive graphical data from graphics display processor 122 through serial interface 132, process the information in image buffer/controller 134, and display the information using LCD image source 136 through diffusing screen 138. Overhead projection unit 130 may also include additional components. For example, a light source may reflect an image from or transmit through LCD image source 136 through a series of lenses and/or reflectors through diffusing screen 138 to display the image shown using LCD image source 136. Further, following diffusion of the image by diffusing screen 138, further image formation may occur using any of a variety of imaging components such as lenses, reflectors, etc.

Figure 1B:
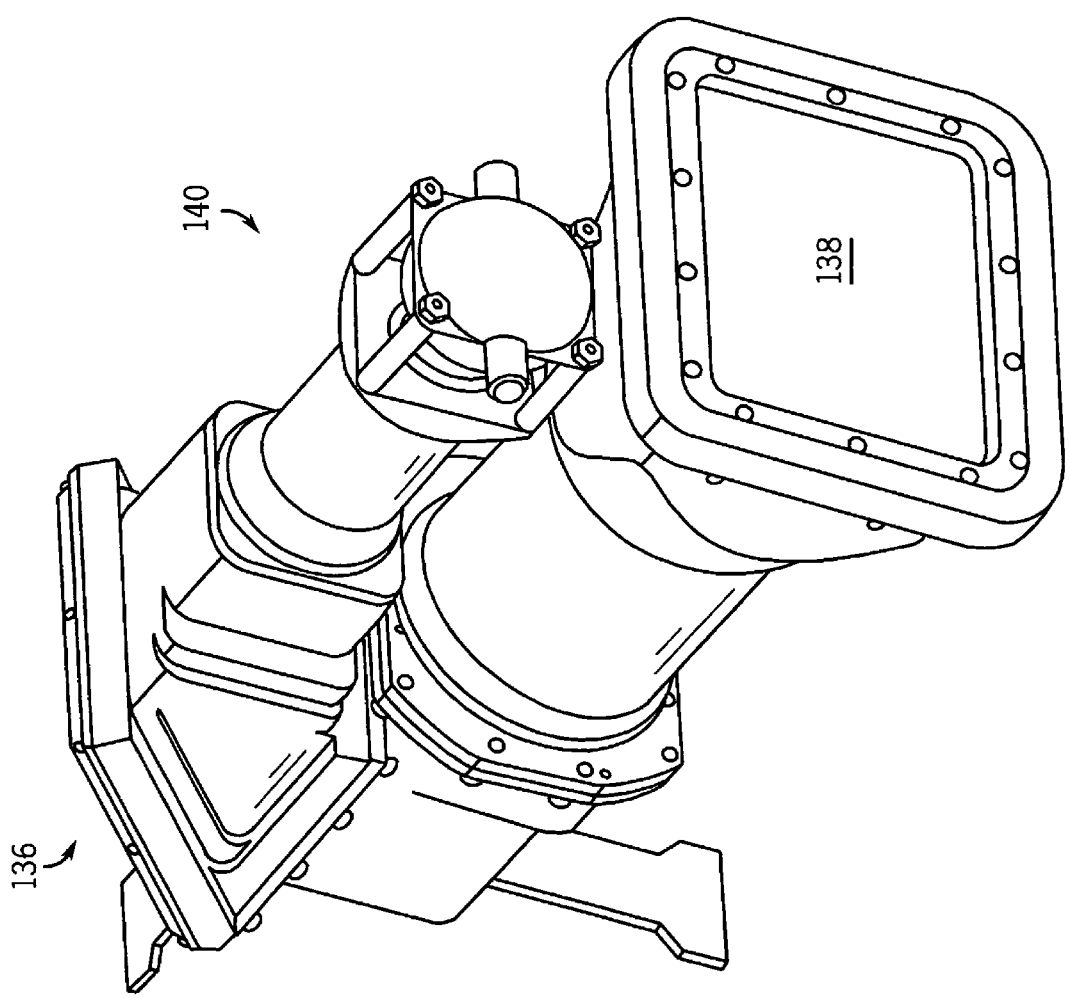
FIG. 1B is a perspective view of a component of an overhead projection unit illustrated in FIG. 1A, according to an exemplary embodiment.

Referring now to FIG. 1B, a perspective view of a LCD projector 140 of an overhead projection unit 130 is illustrated according to an exemplary embodiment. The component 140 includes LCD image source 136 mounted in the rear of overhead projection unit 130. In operation, an image is displayed on LCD image source 136, projected through the body of component 140 using an LED light source or an equivalent, mirrors and lenses to be displayed through diffusing screen 138. Although a specific embodiment is shown in FIG. 1B, component 140 may be any type of projection unit configured to receive an image from LCD image source 136 and project the image through diffusing screen 138.

Referring again to FIG. 1A, video image buffer/controller 134 is a processor including memory that is configured to receive graphical data from graphics display processor 122, verify the integrity of the received graphical data, generate display data from the graphical data, and transfer the graphical data to LCD image source 136. According to an exemplary embodiment, video image buffer/controller 134 is a programmable logic device. According to alternative embodiments, video image buffer/controller may be a processor, software, hardware, etc. configured to provide the functions described herein. Video image buffer/controller 134 is coupled to the serial interface 132 to receive data from serial interface 124 of graphics display processor 122. Video image buffer/controller 134 is further coupled to LCD image source 136 to transmit display data to LCD image source 136.

LCD image source 136 is a LCD image source configured to display the display data received from video image buffer/controller 134. The image displayed on LCD image source 136 is projected through diffusing screen 138. Images generated by LCD image source 136 may be displayed on a combiner and viewed by a pilot of the rotary wing aircraft.

According to an exemplary embodiment, diffusing screen 138 is a screen configured to scatter the light into a cone angle of known and predetermined characteristics. Diffusing screen 138 is configured to maximize light transmission while scattering light in a predetermined, specific direction. According to an exemplary embodiment, diffusing screen 138 may be a rear projection screen commonly used in rear projection television systems and other rear projection displays.

Figure 2:
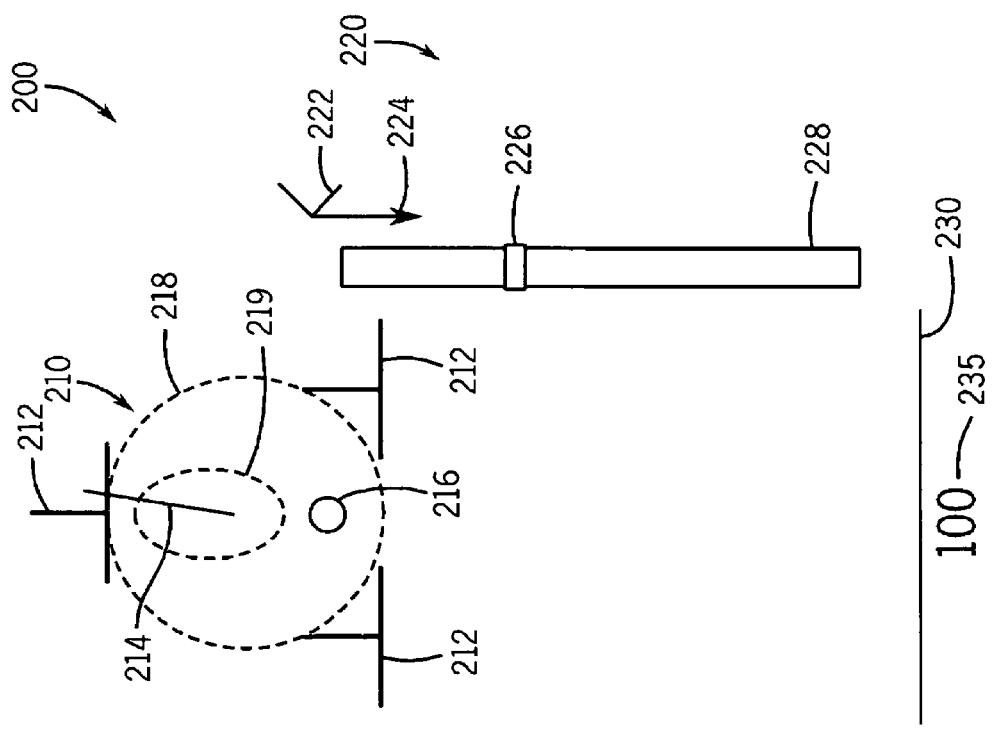
FIG. 2 is a head-up display providing hover and touchdown symbols for a rotary wing aircraft, according to an exemplary embodiment.

Referring now to FIG. 2, a composite hover symbology display 200 including hover and touchdown symbols to be displayed on a HUD for a rotary wing airport is shown, according to an exemplary embodiment. Display 200 is a composite of a plan view of a velocity vector display and a vertical situation display. Accordingly, composite hover symbology display 200 includes a non-conformal flight path vector display 210 and a high resolution vertical position display 220 indicative of the vertical position of the rotary wing aircraft relative to the ground. Composite hover symbology display 200 further includes a ground level indicator 230 and a digital radar altitude readout 235.

Flight path vector display 210 includes three aircraft trident icons 212, a velocity vector indicator 214, a velocity vector trend indicator 216, a hover capture limit indicator 218, and a touchdown limits indicator 219. The above listed indicators may be implemented by one or more computing systems coupled to the systems of the rotary wing aircraft and/or external system to receive attitude or three dimensional velocity information for the rotary wing aircraft. Attitude information or three dimensional velocity information can include any information related to the aircraft such as velocity in any direction, altitude, etc. Flight vector display 210 may further include additional, fewer, and/or a different configuration of elements to perform the functions described herein.

Aircraft trident icons 212 are including two lower inverted "T" icons representative of the main landing gear for the rotary wing aircraft and an upper inverted "T" icon representative of the upper structure of the rotary wing aircraft. Aircraft trident icons 212 are used in combination with ground level indicator 230 and digital radar altitude readout 235 to show a visual representation of the aircraft's vertical situation. According to an exemplary embodiment, the relative position of aircraft trident icons 212 and ground level indicator 235 may remain fixed until a minimum altitude, such as 25 feet, is reached.

Aircraft trident icons 212 are configured to encompass both hover capture limit indicator 218 and touchdown limits indicator 219, shown as dashed lines in FIG. 2. Hover capture limit indicator 218 is a visual representation of the criteria for horizontal motion allowable for coupled hover. Touchdown limits indicator 219 is a visual representation of a horizontal motion criteria for touchdown. A pilot can use hover capture limit indicator 218 and touchdown limits indicator 219 to reduce the horizontal motion of the rotary wing aircraft, as indicated by the length and direction of velocity vector 214 such that the end of the velocity vector is inside either hover capture limit indicator 218 and touchdown limits indicator 219, depending on the particular operation being performed by the pilot.

As shown in FIG. 2, touchdown limits indicator 219 may be represented as an oval shape offset toward a forward velocity direction of the rotary wing aircraft. Advantageously, providing an oval shape indicates to the pilot that the rotary wing aircraft may be able to tolerate more motion in the forward direction, as compared to the lateral or rearward directions, during touchdown.

High resolution vertical position display 220 includes a vertical velocity indicator 222 including a vertical velocity trend indicator 224, a hover capture sink rate indication 226, and a maximum allowable sink rate indicator 228. High resolution vertical position display 220 may further include additional, fewer, and/or a different configuration of elements to perform the functions described herein.

Vertical velocity indicator 222 is configured to receive and display vertical velocity information of the rotary wing aircraft. The received vertical velocity may be received from on board sensors or remote information system providing information to the rotary wing aircraft. Vertical velocity trend indicator 224 is configured to detect and provide a visual indication of trends in the vertical velocity of the rotary wing aircraft. The vertical velocity indicator 222 is used in conjuction with the hover capture sink rate indicator 226 to allow the rotary wing pilot to not only arrest the movement of the aircraft in the horizontal plan, but also in the vertical axis to bring the total 3 dimensional movement of the aircraft to within the capture limits of the coupled hover system. The vertical velocity trend indicator 224 displays the rotary wing aircraft acceleration in the vertical axis and acts as a predictor of the aircrafts response to pilot inputs. This information helps resolve the particular problem of the rotary wing pilot's reactions getting behind the actions of the aircraft. The maximum allowable sink rate indicator 228 provides the pilot with an indication of the maximum downward velocity that is permissible for the current flight conditions. For in-flight and descending operations, the computer displays the maximum vertical velocity permitted before the aircraft enters into an unrecoverable state, a phenomena particular to rotary wing aircraft. In a landing situation, the maximum allowable sink rate indicator 228 provides the pilot with the maximum downward speed permitted by the operational capabilities of the aircraft at touchdown. This information is stored in the computer, and can be based on aircraft weight entered at the beginning of the flight. Displaying this information can prevent a pilot from exceeding the limits of the airframe or injuring passengers.

Figure 3:
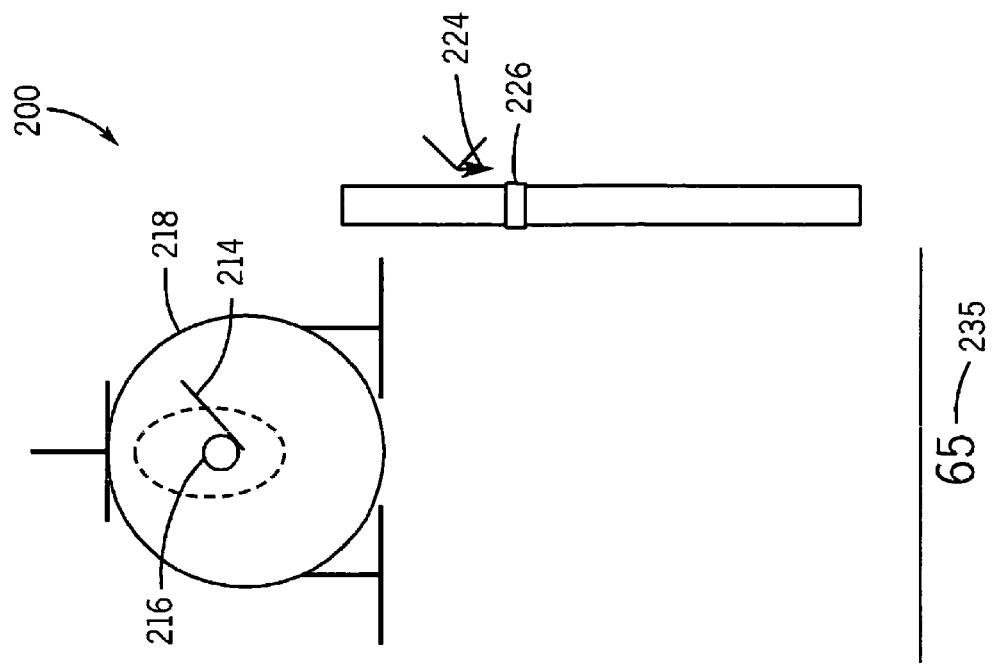
FIG. 3 is another embodiment of the system of FIG. 2, according to an exemplary embodiment.

For example, referring now to FIG. 3, the composite hover symbology display 200 displaying satisfaction of the hover capture criteria is shown, according to an exemplary embodiment. Display 200, as shown in FIG. 3, is representative of a rotary wing aircraft having a digital radar altitude of 65 ft above ground level as indicated by digital radar altitude indicator 235. The rotary wing aircraft is current moving forward with a rightward drift as shown by the velocity vector indicator 214. The rightward drift is decreasing as shown by velocity vector trend indicator 216, being positioned to the left of velocity vector indicator 214. The current vertical velocity is within the hover capture sink rate as indicated by hover capture sink rate limit indicator 226 and is stable as indicated by vertical velocity trend indicator 224.

As shown in FIG. 3, the hover capture limit indicator 218 may be switched from a dashed line indicator to a solid line indicator upon satisfaction of the criteria. The touchdown limit criteria has not been satisfied by the aircraft as shown by the dashed touchdown limits indicator 219.

Referring now to FIG. 4, the composite hover symbology display 200 displaying satisfaction of both the hover capture criteria and the touchdown limit criteria is shown, according to an exemplary embodiment. The rotary wing aircraft has dropped to an altitude of 4 feet and is still moving slightly forward and drifting right. Further, ground level indicator 230 has been modified to three line to indicate that the rotary wing aircraft is within 25 feet of the ground. Ground level indicator 230 has also been modified such that ground level indicator 230 will move relatively closer to aircraft trident indicator 212 within display 200.

Figure 5:
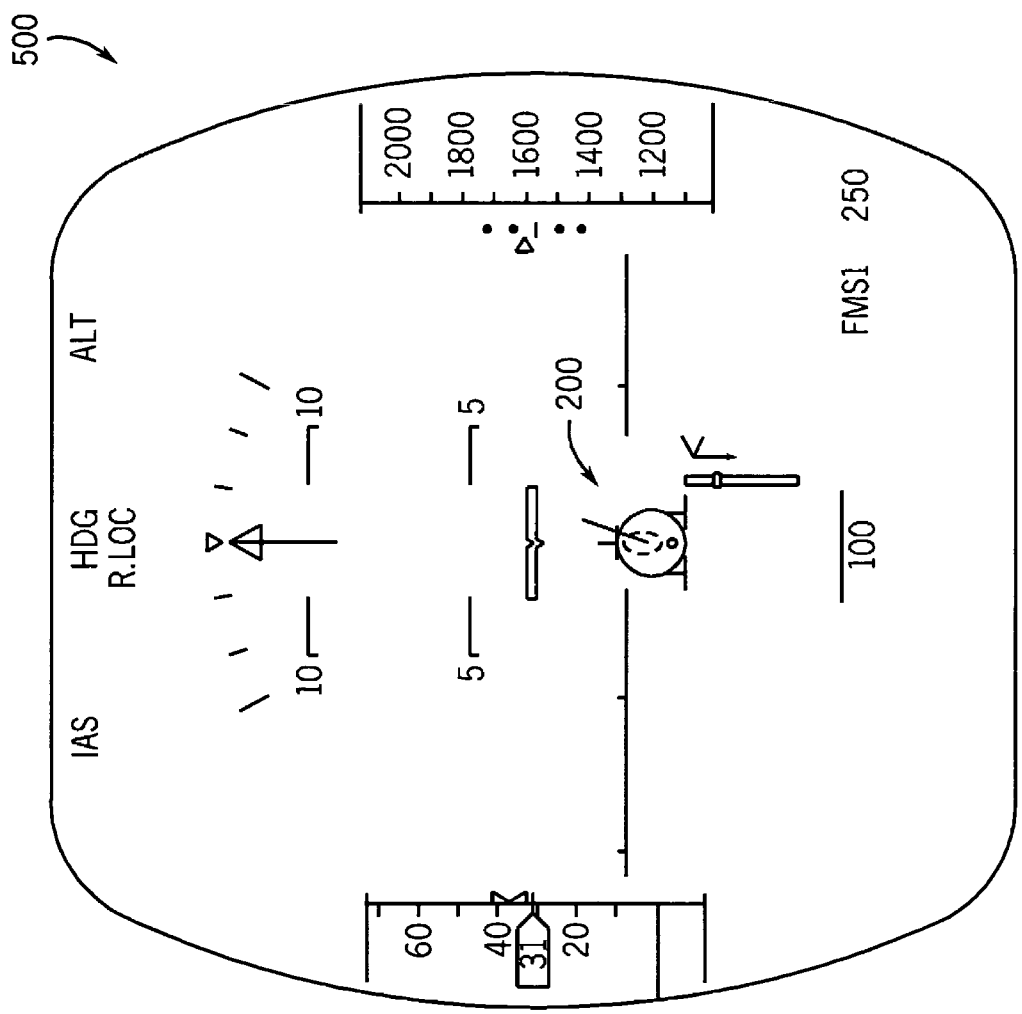
FIG. 5 is another embodiment of the system of FIG. 2, according to an exemplary embodiment.

Referring now to FIG. 5, a HUD display 500 is shown integrating the composite hover symbology display 200 is shown, according to an exemplary embodiment. Display 200 may be integrated based on pilot selection of a hover mode or when the rotary aircraft attitude information matches predefined criteria indicative that the rotary aircraft is approaching hover or touchdown. HUD display 500 may configured to continue to display primary fight information such as airspeed, altitude, and conformal horizon. Display 500 may be configured to include an occlusion zone surrounding composite hover symbology display 200 to prevent pitch bars or the horizon from interfering with the information in symbology display 200.

Advantageously, providing the visual indication to the pilot of the rotary wing aircraft provides a clear feedback on a single display such that the pilot is not required to look away from the outside view. In other exemplary embodiments, the symbology used and location and appearance of information on the combiner may differ without departing from the scope of the invention. Conventionally, this information would be provided on an alternative display which was not a head-up display and therefore adding such information here to the head-up display provides further usability to the pilot such that the pilot does not have to look at both a conformal display on the head-up display and a non-conformal display which is displayed on a head-down display.

While the detailed drawings, specific examples, and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. A head-up display (HUD), the HUD being for use on board a rotary wing aircraft, the HUD comprising:
    a projector;
    a combiner, the combiner enabling viewing of the world outside of the combiner, and allowing viewing of information provided from the projector;
    wherein a hover capture limit indicator and a touchdown limits indicator for the rotary wing aircraft is provided onto the combiner, the hover capture limit indicator being provided as a first perimeter on the combiner and the touchdown limits indicator being provided as a second perimeter inside the first perimeter on the combiner;
    wherein the touchdown limits indicator indicates a touchdown limit criteria is satisfied when a velocity vector is within the second perimeter.

2. The head-up display of claim 1, wherein
    the second perimeter of the touchdown limits indicator changes from a dashed perimeter to a solid perimeter to provide visual indication of satisfying the touchdown limit criteria.

3. The head-up display of claim 2, wherein the touchdown limits indicator is provided as an oval perimeter offset toward a forward velocity direction.

4. The head-up display of claim 1, wherein
    the first perimeter of the changes from a dashed perimeter to a solid perimeter to provide visual indication of whether velocity information for the rotary wing aircraft satisfies a hover capture limit criteria.

5. The head-up display of claim 1, further comprising:
    a ground level indicator located proximate to a digital radar altitude indicator wherein the ground level indicator is configured to change based on the altitude of the rotary wing aircraft.

6. The head-up display of claim 5, wherein the ground level indicator and digital radar altitude indicator are dynamically positioned on the head-up display relative to a rotary wing aircraft indicator based on the altitude of the rotary wing aircraft.

7. The head-up display of claim 1, further including a vertical velocity indicator indicative of the vertical velocity of the rotary wing aircraft, the vertical velocity indicator including a vertical velocity trend indicator.

8. The head-up display of claim 7, wherein the vertical velocity indicator is shown relative to a hover capture sink rate indicator to indicate whether a current vertical velocity of the rotary wing aircraft satisfies a hover capture sink rate criteria.

9. A method of providing symbols for an aircraft for an aircraft on a combiner for a head-up display (HUD), the method comprising:
    determining current three dimensional velocity information for the aircraft;
    determining whether the current three dimensional velocity information satisfies one or more hover capture criteria;
    providing aircraft symbology on the combiner, the aircraft symbology indicating whether the current three dimensional velocity information satisfies the one or more hover capture criteria, wherein the aircraft symbology includes a first perimeter representing a touchdown limit and a second perimeter representing a hover capture limit, wherein a velocity vector is at least partially provided within the first perimeter and the second perimeter, and wherein the first perimeter is inside the second perimeter;
    providing a horizon line onto the combiner, the horizon line being conformally mapped on the combiner; and
    providing a ground level indicator, wherein the aircraft symbology is disposed above the ground level indicator wherein a distance between the aircraft symbology and the ground level indicator is related to altitude of the aircraft.

10. The method of claim 9, wherein the hover capture criteria includes a hover capture sink rate criteria.

11. The method of claim 10, wherein the aircraft symbology includes a visual indication of whether a vertical velocity satisfies the hover capture sink rate criteria.

12. The method of claim 11, further including modifying the distance only when the altitude of the aircraft indicates that the aircraft is within a first altitude.

13. The method of claim 12, wherein the first altitude is 25 feet in altitude.

14. A system for projecting hover and touchdown symbols on a combiner of a head-up display (HUD), comprising:
    a projection means;
    a combiner means, the combiner means enabling viewing of the world outside of the combiner means, and allowing viewing of information provided from the projection means;
    a computing means coupled to the projection means and providing hover and touchdown symbols representative of velocity information for a rotary wing aircraft, the hover and touchdown symbols being provided onto the combiner means, the hover and touchdown symbols including a hover capture limit indicator being provided as a first perimeter and a touchdown limits indicator provided as a second perimeter inside the first perimeter, wherein a velocity vector is provided at least partially within the first and second perimeters and when a touchdown limits criteria is met, the velocity vector is entirely within the second perimeter.

15. The head-up display of claim 14, wherein the second perimeter is a solid line when the touchdown limits criteria is met.

16. The head-up display of claim 15, wherein the second perimeter is provided as an oval offset toward a forward velocity direction.

17. The head-up display of claim 14, wherein the hover capture limit indicator is configured to provide visual indication of whether velocity information for the rotary wing aircraft satisfies a hover capture limit criteria.

18. The head-up display of claim 14, further comprising:

a ground level indicator located proximate to a digital radar altitude indicator wherein the ground level indicator is configured to change based on the altitude of the rotary wing aircraft.

19. The head-up display of claim 18, wherein the ground level indicator and digital radar altitude indicator are dynamically positioned on the head-up display relative to a rotary wing aircraft indicator based on the altitude of the rotary wing aircraft.

* * * * *